(12) United States Patent
Park et al.

(10) Patent No.: US 12,510,423 B2
(45) Date of Patent: Dec. 30, 2025

(54) TIME TEMPERATURE INDICATION MODULE

(71) Applicant: TTI CO., LTD., Suwon-si (KR)

(72) Inventors: Ji Hoon Park, Yongin-si (KR); Bong Soo Kwon, Gunpo-si (KR)

(73) Assignee: TTI CO., LTD., Suwon-si (KR)

(*) Notice: Subject to any disclaimer, the term of this patent is extended or adjusted under 35 U.S.C. 154(b) by 400 days.

(21) Appl. No.: 18/306,641

(22) Filed: Apr. 25, 2023

(65) Prior Publication Data

US 2023/0258508 A1    Aug. 17, 2023

Related U.S. Application Data

(63) Continuation of application No. PCT/KR2021/015058, filed on Oct. 26, 2021.

(30) Foreign Application Priority Data

Oct. 26, 2020  (KR) .................. 10-2020-0139074

(51) Int. Cl.
| | | |
|---|---|---|
| *G01K 11/00* | (2006.01) | |
| *G01K 3/04* | (2006.01) | |
| *G01K 11/06* | (2006.01) | |
| *G01K 11/12* | (2021.01) | |
| *G09F 3/00* | (2006.01) | |
| *G09F 3/02* | (2006.01) | |

(52) U.S. Cl.
CPC ................ *G01K 11/00* (2013.01); *G01K 3/04* (2013.01); *G01K 11/06* (2013.01); *G01K 11/12* (2013.01); *G09F 3/00* (2013.01); *G09F 3/02* (2013.01)

(58) Field of Classification Search
CPC .......... G01K 11/00; G01K 3/04; G01K 11/06; G01K 11/12; G09F 3/00; G09F 3/02
See application file for complete search history.

(56) References Cited

U.S. PATENT DOCUMENTS 3,399,284 A * 8/1968 Ayers .................... B01D 15/08
374/E3.004
5,326,174 A * 7/1994 Parker ................... G01K 11/14
374/161

(Continued)

FOREIGN PATENT DOCUMENTS

KR    10-2011-0008419 A    1/2011
KR       10-1123956 B1    3/2012
(Continued)

OTHER PUBLICATIONS

International Search Report issued in PCT/KR2021/015058; mailed Jan. 28, 2022.

*Primary Examiner* — Laura Martin
*Assistant Examiner* — Philip L Cotey
(74) *Attorney, Agent, or Firm* — Studebaker Brackett PLLC

(57) ABSTRACT

The present invention relates to a time-temperature indicating module that causes a spread material whose degree of diffusion changes with temperature change to be absorbed and diffused into a diffusion material through induction of a crack, guides a diffusion direction of the spread material through a guide line printed in a longitudinal direction of the diffusion material and also enables a clear start time point of diffusion to be displayed.

9 Claims, 7 Drawing Sheets

(56) References Cited

U.S. PATENT DOCUMENTS

| | | | | |
|---|---|---|---|---|
| 5,602,804 | A * | 2/1997 | Haas | G01K 3/04 368/327 |
| 6,042,264 | A * | 3/2000 | Prusik | G01K 3/04 374/150 |
| 6,544,925 | B1 * | 4/2003 | Prusik | G01N 31/229 503/201 |
| 6,741,523 | B1 * | 5/2004 | Bommarito | G04F 1/00 374/102 |
| 11,615,367 | B2 * | 3/2023 | Lawler, Jr. | G06Q 10/0833 705/333 |
| 2003/0214997 | A1 * | 11/2003 | Diekmann | G04F 1/00 374/102 |
| 2007/0119364 | A1 * | 5/2007 | Taylor | G01K 11/06 374/E11.006 |
| 2007/0125296 | A1 * | 6/2007 | Taylor | G01K 3/04 374/E3.004 |
| 2008/0210152 | A1 * | 9/2008 | Robinson | G04F 1/06 368/327 |
| 2012/0079981 | A1 * | 4/2012 | Huffman | G01K 1/02 116/207 |
| 2012/0236900 | A1 * | 9/2012 | Hubbard | G01K 3/04 374/102 |
| 2013/0287059 | A1 * | 10/2013 | Selman | G01K 3/04 374/102 |
| 2013/0305980 | A1 * | 11/2013 | Park | G01K 11/12 493/379 |
| 2014/0154808 | A1 * | 6/2014 | Patel | A61L 2/28 436/1 |
| 2015/0308901 | A1 * | 10/2015 | Salman | G01K 3/04 374/102 |
| 2016/0349225 | A1 * | 12/2016 | Prusik | G01K 11/12 |
| 2018/0372549 | A1 * | 12/2018 | Kwon | G01K 3/04 |
| 2019/0137462 | A1 * | 5/2019 | Patel | G01N 31/229 |

FOREIGN PATENT DOCUMENTS

| | | |
|---|---|---|
| KR | 10-2014-0129598 A | 11/2014 |
| KR | 10-2017-0090675 A | 8/2017 |
| KR | 10-2018-0065291 A | 6/2018 |

* cited by examiner

TIME TEMPERATURE INDICATION MODULE

CROSS-REFERENCE TO RELATED APPLICATIONS

The present application is a Continuation of International Patent Application No. PCT/KR2021/015058 filed on Oct. 26, 2021, which claims priority to and the benefit of Korean Patent Application No. 10-2020-0139074 filed in the Korean Intellectual Property Office on Oct. 26, 2020, the entire contents of which are incorporated herein by reference.

TECHNICAL FIELD

The present invention relates to a time-temperature indicating module, and more specifically, to a time-temperature indicating module that causes a spread material whose degree of diffusion changes with temperature change to be absorbed and diffused into a diffusion material through induction of a crack, guides a diffusion direction of the spread material through a guide line printed in a longitudinal direction of the diffusion material and also enables a clear start time point of diffusion to be displayed.

BACKGROUND ART

The cold storage and refrigeration industry has been advancing recently. Accordingly, products that need to be stored at a specific temperature environment such as foods, medicine and medical supplies, and cosmetics are being developed and used.

Exceptionally, products in which foods are heated, sterilized and stored in sealed metal cans, such as canned goods, can be preserved for a long time. However, the types of applicable products are limited because they must be heated and sterilized.

On the other hand, these products that are delivered to consumers via various distribution processes have different shelf lives and require different environments (for example, direct sunlight, optimal storage temperature, humidity, etc.) during the distribution process.

In particular, among the products, foods or medicine and medical supplies must be stored within an optimal temperature range so that they stay fresh throughout the entire distribution process from producers to consumers. As for medicine and medical supplies, if they are exposed to an unspecified temperature for a certain period of time or longer, the ingredients thereof may go bad and cause serious medical side effects to the users. In the case of foods, if the foods are stored at a temperature higher than specified temperatures for a long time, contents may go bad and cause illnesses such as food poisoning.

Therefore, it is very important that consumers be able to visually verify the distribution process of these products (medicine and medical supplies, foods, etc.).

However, it is very difficult for end-consumers to verify with their own eyes whether a product was distributed under specified temperature management at the time of purchase. End-consumers can only determine that a product was not properly refrigerated or kept frozen when the color, flavor or taste of the product has changed. Moreover, even those who professionally manage products for which refrigeration and freezing are required cannot easily verify with the naked eyes whether a product was properly distributed under the specified temperature management.

Therefore, many methods and devices have been introduced to allow consumers to determine whether such products have been distributed under the specified temperature management. Accordingly, major global companies such as 3M have been using a time-temperature indicating module (a mechanism or label attached on a product to display a cumulative time-temperature record of the product) such as a time-temperature indicator (TTI), and various types of TTIs are being developed and used.

On the other hand, in the case of the existing time-temperature indicating modules, a spread material (fatty acid ester) must be wrapped with a separate packaging material such as gelatin, which causes an unnecessary space and increases a volume.

Furthermore, also in a manufacturing process of the time-temperature indicating module of the related art, a 'liquid-in sealing method' is used in a process of interposing the spread material between fabrics. The 'liquid-in sealing method' is a method of interposing liquid having a predetermined viscosity between fabrics. In the method, the spread material is injected into an inside of a pipe-shaped fabric to fill the inside and then both ends are heat-fused, sealed and cut.

However, the 'liquid-in sealing method' has problems in that the heat fusion is not properly made due to the spread material injected between two fabrics and the sealed portion is weakened. As a result, while the time-temperature indicating module is produced or distributed, the spread material leaks or flows out through the sealed portion, contaminating the surroundings.

DETAILED DESCRIPTION OF THE INVENTION

Technical Problem

The present invention has been made to solve the above-described problems, and is to provide a time-temperature indicating module that causes a spread material whose degree of diffusion changes with temperature change to be absorbed and diffused into a diffusion material through induction of a crack, guides a diffusion direction of the spread material through a guide line printed in a longitudinal direction of the diffusion material and also enables a clear start time point of diffusion to be displayed.

Technical Solution

A time-temperature indicating module according to an exemplary embodiment of the present invention may include: an indication window-printed film having an upper surface on which an indication window for enabling a degree of diffusion of a spread material to be visually recognized to an outside is printed and one side region provided with an inflow region for inflow of the spread material; a diffusion guide line printed on a lower side of the indication window-printed film for enabling a degree of diffusion of the spread material introduced through the inflow region to be indicated, and having an embossed surface; a diffusion film provided on the lower side of the indication window-printed film and configured to absorb and diffuse the spread material introduced through the inflow region; a color film provided to have a specific color on a lower side of the diffusion film, and configured, as the diffusion film becomes transparent when the spread material is diffused through the diffusion film, to enable the specific color to be visually recognized to the outside through the indication window-printed film; a lower leakage-preventing film provided on a lower side of the color film and configured to prevent the spread material introduced through the inflow region from leaking to the outside; a cracking member provided on an upper side of the indication window-printed film and configured to temporarily cover the inflow region, to be cracked by external force and to allow the spread material to be introduced through the inflow region; and an upper leakage-preventing film laminated along an upper surface edge of the indication window-printed film and filled with the spread material and configured to prevent the spread material from leaking to the outside.

In an exemplary embodiment, a surface treatment may be performed on a lower surface of the indication window-printed film through a corona discharge equal to or higher than a specific dyne level.

In an exemplary embodiment, one or more incision lines may be formed in the inflow region, and the spread material may be introduced through the one or more incision lines.

In an exemplary embodiment, the diffusion guide line may include a diffusion start line formed to have a larger area than the inflow region and having an embossed surface; a diffusion start reference line formed to have a specific length in a longitudinal direction of the indication window-printed film, starting from the diffusion start line, and serving as a diffusion start reference point of the spread material diffusing through the diffusion film; and one or more diffusion lines for displaying the degree of diffusion of the spread material diffusing along the diffusion film, in which a space for introducing the spread material may be secured between the diffusion guide line and the diffusion film by the embossing.

In an exemplary embodiment, the diffusion start reference line may be formed to protrude from the lower surface of the indication window-printed film, and the spread material introduced through the inflow region may start to diffuse by the diffusion film, escape through a gap formed between the diffusion film and the diffusion start reference line, and gradually expand in diffusion in the longitudinal direction of the diffusion film.

In an exemplary embodiment, each of the upper leakage-preventing film and the indication window-printed film may be made of at least one of a polyethylene terephthalate (PET) material, a polypropylene (PP) material, a polyethylene (PE) material, or a nylon (NY) material that are heat-fusible to each other.

In an exemplary embodiment, the diffusion film may be a micro-porous film.

In an exemplary embodiment, when the cracking member is cracked by external force, the spread material may be introduced through the one or more incision lines.

In an exemplary embodiment, the indication window-printed film may be formed with a display window of a transparent region for enabling the diffusion start reference line and the one or more diffusion lines to be visually recognized to the outside, and as the spread material is diffused, the one or more diffusion lines may become sequentially visible through the display window and displayed to the outside.

In an exemplary embodiment, the spread material may be fatty acid ester.

Advantageous Effects

According to an aspect of the present invention, the diffusion time point and degree of diffusion of the spread material can be clearly visually recognized through the diffusion start reference line printed in the longitudinal direction of the diffusion film.

In addition, according to the present invention, the spread material is injected between fabrics laminated to each other through heat fusion without being wrapped with a separate packaging material such as gelatin. Therefore, the present invention does not create an unnecessary space, thereby minimizing the volume.

Further, according to the present invention, a synthetic resin film that enables the sealed portion resulting from the heat fusion to have high fusion strength is applied when filing the spread material, thereby preventing the spread material in a liquid state from leaking or flowing out through the sealed portion to the outside due to the external pressure. Therefore, the present invention has an advantage in that the spread material does not contaminate an outer side of the time-temperature indicating module.

In particular, the present invention has an advantage of securing a diffusion passage of the spread material between the indication window-printed film and the diffusion film by embossing the surface of the diffusion guide line.

BEST MODE

Hereinafter, preferred exemplary embodiments are presented for better understanding of the present invention. However, the following exemplary embodiments are only provided so that the present invention can be more easily understood. Therefore, the content of the present invention should not be construed as being limited to the exemplary embodiments set forth herein.

Figure 1:
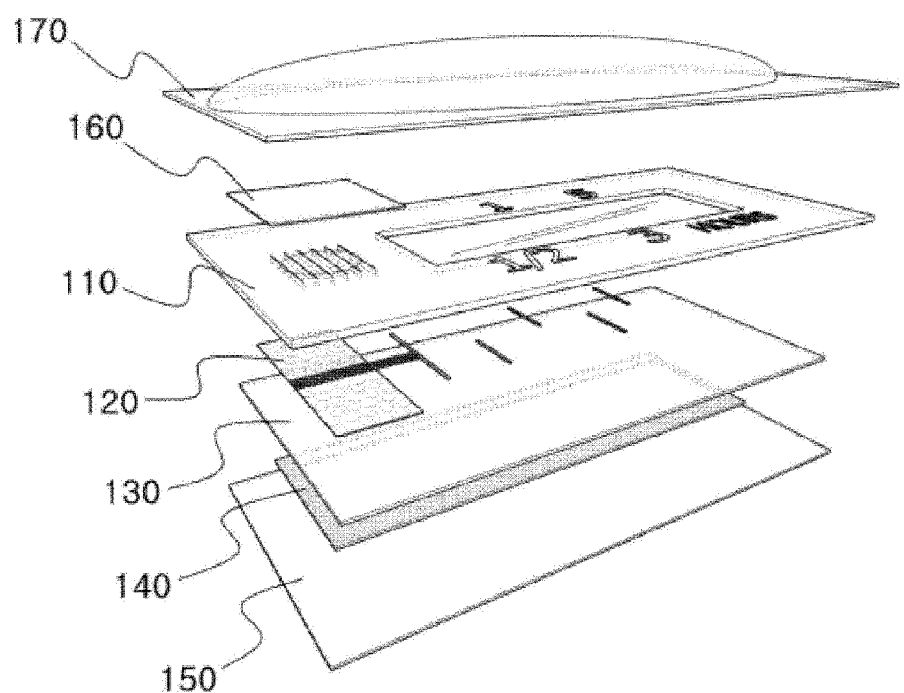
FIG. 1 is an exploded perspective view of a time-temperature indicating module 100 according to an exemplary embodiment of the present invention.
Figure 2:
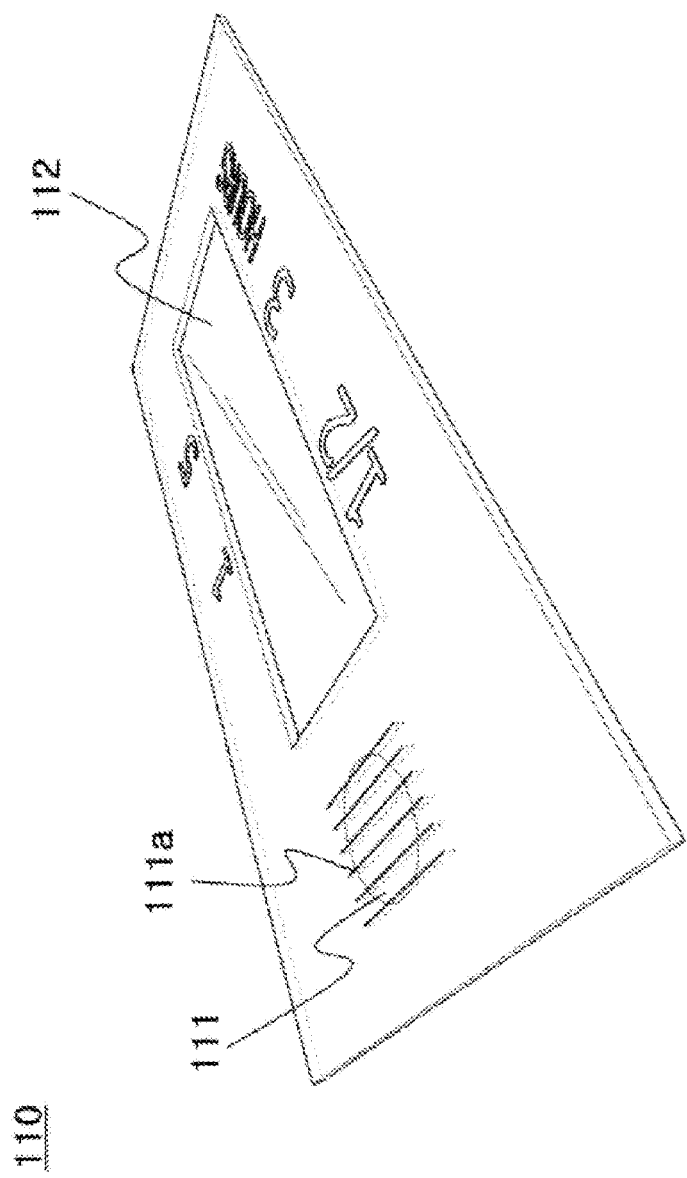
FIG. 2 is a view showing an indication window-printed film 110 in more detail.
Figure 3:
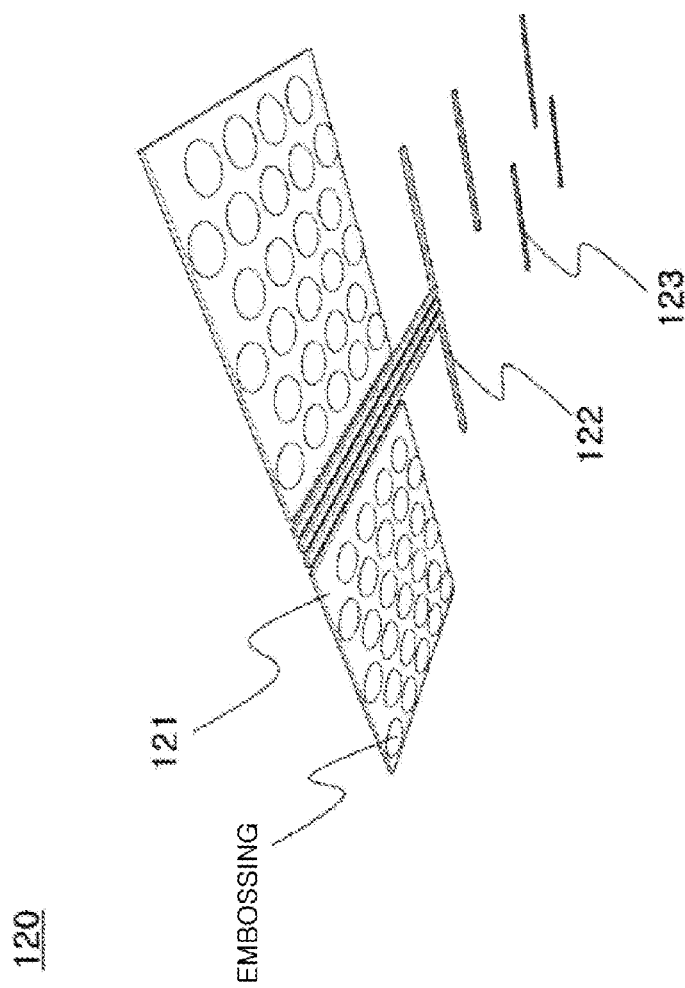
FIG. 3 is a view showing a diffusion guide line 120 in more detail.
Figure 4:
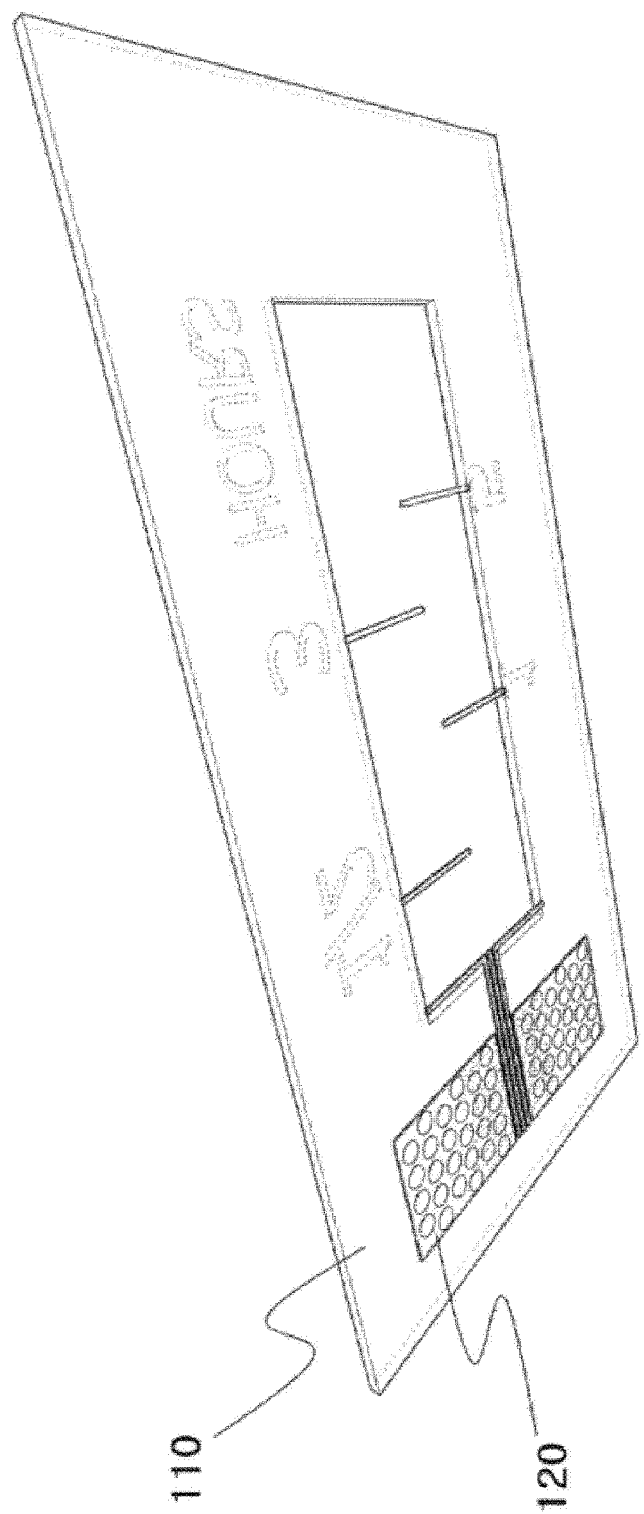
FIG. 4 is a view showing a state in which the diffusion guide line 120 is provided on a lower surface of the indication window-printed film 110.
Figure 5:
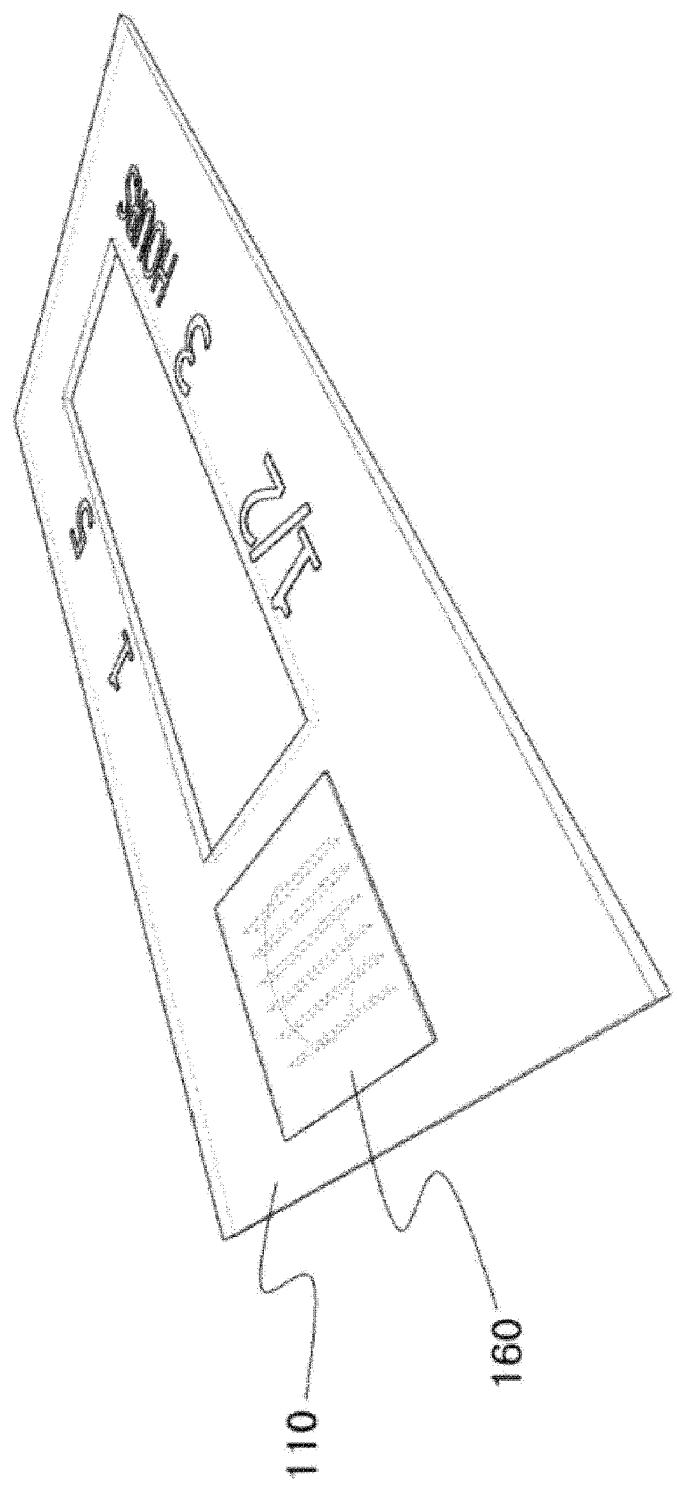
FIG. 5 is a view showing a state in which a cracking member 160 is provided on an upper surface of the indication window-printed film 110.
Figure 6:
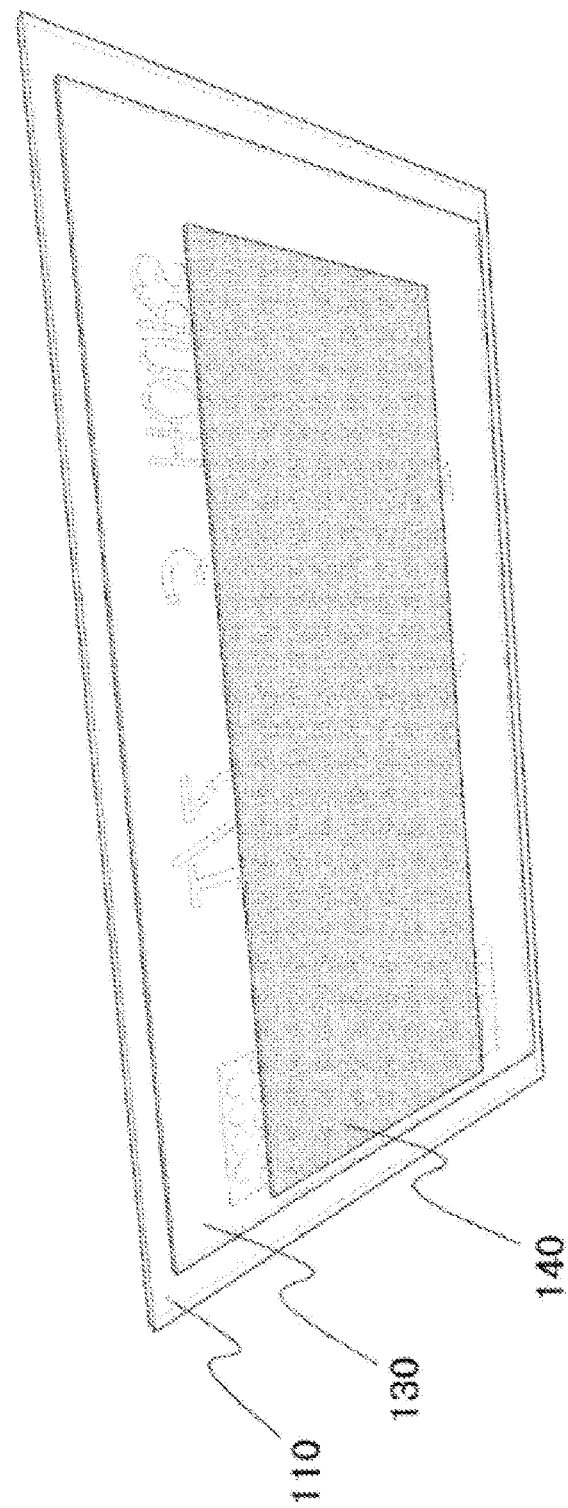
FIG. 6 is a view showing a state in which a color film 140 is provided on a lower surface of a diffusion film 130.

FIG. 1 is an exploded perspective view of a time-temperature indicating module 100 according to an exemplary embodiment of the present invention, FIG. 2 is a view showing an indication window-printed film 110 in more detail, FIG. 3 is a view showing a diffusion guide line 120 in more detail, FIG. 4 is a view showing a state in which the diffusion guide line 120 is provided on a lower surface of the indication window-printed film 110, FIG. 5 is a view showing a state in which a cracking member 160 is provided on an upper surface of the indication window-printed film 110, and FIG. 6 is a view showing a state in which a color film 140 is provided on a lower surface of a diffusion film 130.

Referring to FIGS. 1 to 6, the time-temperature indication module 100 according to an exemplary embodiment of the present invention largely includes an indication window-printed film 110, a diffusion guide line 120, a diffusion film 130, a color film 140, a lower leakage-preventing film 150, a cracking member 160, and an upper leakage-preventing film 170.

First, the indication window-printed film 110 refers to a film on which an indication window for enabling a degree of diffusion of a spread material to be visually recognized to an outside is printed, and has one side region provided with an inflow region 111 for allowing the spread material to flow in a downward direction.

More specifically, a crack induction line for crack induction of the cracking member 160, which will be described later, a number for displaying a diffusion time or diffusion date of the spread material, and the like are printed on the indication window-printed film 110.

In addition, the indication window-printed film 110 is formed with a display window 112 of a transparent region for enabling a degree of diffusion of the spread material to be actually visually recognized to an outside. Therefore, when the spread material is diffused through the diffusion film 130 described later, the diffusion film 130 becomes transparent and the color film 140 becomes visible, revealing a specific color (for example, red). This makes it possible for a user to check a diffusion state of the spread material.

Note that the inflow region 111 of the indication window-printed film 110 is formed with one or more incision lines 111a for allowing the spread material to flow downward. Therefore, the spread material above the indication window-printed film 110 flows below the indication window-printed film 110 through the one or more incision lines 111a and is absorbed by the diffusion film 130.

In an exemplary embodiment, the indication window-printed film 110 is made of any one of a polyethylene terephthalate (PET) material, a polypropylene (PP) material, a polyethylene (PE) material, and a nylon (NY) material, and forms a sealed portion at an edge through heat fusion with the upper leakage-preventing film 170 described later.

The diffusion guide line 120 is printed on a rear surface of the indication window-printed film 110, i.e., a region adjacent to the inflow region 111 on the lower surface of the indication window-printed film 110, and serves to gradually indicate a degree of diffusion of the spread material introduced through the inflow region 111.

More specifically, the diffusion guide line 120 includes a diffusion start line 121 formed to have a larger area than the inflow region 111 and having an embossed surface, a diffusion start reference line 122 formed to have a specific length in a longitudinal direction of the indication window-printed film 110, starting from the diffusion start line 121, and serving as a diffusion start reference point of the spread material, and one or more diffusion lines 123 for displaying the degree of diffusion of the spread material.

The diffusion start line 121 is printed at a position corresponding to the inflow region 111 on the lower surface of the indication window-printed film 110, and a surface treatment is performed on the lower surface of the indication window-printed film 110 through a corona discharge equal to or higher than a specific dyne level.

For example, a surface treatment through a corona discharge of 36 dyne level or higher may be performed to roughly modify the surface so that the surface is not smooth. In this case, since the surface treatment through the corona discharge uses a conventional surface treatment technology for increasing ink adhesion of the indication window-printed film 110, the detailed description thereof will be omitted. As the surface treatment through the corona discharge is performed, the adhesion of the diffusion guide line 120 can be further increased, and in the distribution process of the time-temperature indicating module 100, the diffusion guide line 120 can be maintained in a state in which it firmly adheres to the indication window-printed film 110 without separating from the same.

Note that, for the surface treatment through the corona discharge, the dyne level is not restricted to 36 dyne and can be changed.

As the surface of the diffusion start line 121 is embossed, a certain space is formed between the diffusion start line and the diffusion film 130. The space may be a passage for the spread material introduced through the inflow region to be more easily delivered to the diffusion film 130.

Starting from the diffusion start line 121, the diffusion start reference line 122 is formed along the longitudinal direction of the indication window-printed film 110.

The diffusion start reference line 122 is printed in the form of forming a passage along the longitudinal direction of the indication window-printed film 110, and in this case, has a fine protruding form.

Therefore, when the indication window-printed film 110 and the diffusion film 130 are laminated through heat fusion, a fine gap may be formed between the diffusion start line 121 and diffusion start reference line 122 and the diffusion film 130.

In this case, the spread material introduced through the inflow region 111 escapes through the gap (a kind of passage) formed by the diffusion start reference line 122 and gradually diffuses in the longitudinal direction of the diffusion film 130. Although the diffusion through the diffusion film 130 can proceed even if the diffusion start reference line 122 is not printed, the diffusion start reference may become ambiguous because the spread material diffuses in a circular shape similar to that of the inflow region 111.

However, since one side of the diffusion start reference line 122 is formed in the form of being bent in a width direction of the indication window-printed film 110, the spread material escaping through the gap formed by the diffusion start reference line 122 naturally forms a diffusion start line by the bent portion formed at the distal end of the diffusion start reference line 122 and can diffuse in a straight line form.

The one or more diffusion lines 123 are printed at regular intervals on the lower surface of the indication window-printed film 110 so as to serve to indicate the degree of diffusion of the spread material diffusing along the diffusion film 130.

These diffusion lines 123 are printed to correspond to positions of time and temperature (for example, 30 min., 60 min., 120 min., etc.) printed on the upper surface of the indication window-printed film 110. Therefore, as the diffusion film 130 absorbs the spread material, the degree of diffusion of the spread material may be visually recognized by the user through the one or more diffusion lines 123.

The diffusion film 130 is laminated with the lower surface of the indication window-printed film 110 (the surface on which the diffusion guide line 120 is printed) through heat fusion, and can serve to absorb and diffuse the spread material introduced through the inflow region 111. The diffusion film 130 may be a type of an opaque micro-porous film.

The diffusion film 130 remains opaque before it absorbs the spread material, and when the diffusion film contacts the spread material, a diffusion region thereof may change to a transparent state, starting from the contact point. Therefore, as the diffusion film 130 gradually changes to a transparent state, starting from the contact point with the spread material, a specific color region (for example, red) printed on the color film 140 described later becomes gradually visible.

The color film 140 is printed on a lower surface of the diffusion film 130, and as the diffusion film 130 absorbs the spread material, the color film turns from opaque to transparent, revealing the color of the color film 140. Therefore, the user can check the degree of diffusion of the spread material with a clear color.

The color of the color film 140 may be changed to any color other than red.

The lower leakage-preventing film 150 is provided on a lower surface of the color film 140, is laminated with the indication window-printed film 110 through heat fusion, and serves to prevent the spread material absorbed through the diffusion film 130 from leaking to the outside. Like the material of the indication window-printed film 110, the material of the lower leakage-preventing film 150 is any one of a polyethylene terephthalate (PET) material, a polypropylene (PP) material, a polyethylene (PE) material, and a nylon (NY) material, and thus, can be easily thermally fused and laminated with the indication window-printed film 110.

In addition, the upper leakage-preventing film 170 is laminated at an edge with the indication window-printed film 110 on an opposite surface to the lower leakage-preventing film 150, i.e., the upper surface of the indication window-printed film through heat fusion. In this case, a space for filling the spread material is provided between the upper leakage-preventing film 170 and the indication window-printed film 110, and the spread material filled in the space flows in the direction of the diffusion film 130 through a crack of the cracking member 160 described later and through the inflow region 111.

The cracking member 160 is provided in the form of blocking a through-hole 121 between the indication window-printed film 110 and the upper leakage-preventing film 170.

The cracking member 160 serves to temporarily prevent the inflow of the spread material through the inflow region 111 at normal times, but may be burst to create a crack by a pressure applied from the outside, thereby enabling the spread material to be absorbed into the diffusion film (130).

In this case, since the cracking member 160 can be formed and bonded at a position corresponding to the formation position of the inflow region 111 and the surface treatment through the corona discharge has been performed on the upper surface of the indication window-printed film 110 (the surface on which the cracking member 160 is positioned), the cracking member 160 can be more easily bonded.

Since the cracking member 160 needs to be easily burst by a pressure applied from the outside (for example, by a user gripping and snapping the time-temperature indicating module 100), the cracking member 160 may be a type of synthetic resin that is a mixture of printing ink resin and crystalline compound powder (for example, calcium carbonate powder or titanium dioxide powder ranging from 2 to 150 micrometers in particle size). In addition, the cracking member 160 may be printed and bonded to a size capable of covering the inflow region 111. In this case, by printing the cracking member in intervals of 60 to 100 meshes, the cracking member can be made to easily burst by a pressure applied from the outside.

Next, a process in which the spread material is diffused through the diffusion film 130 will be described with reference to FIGS. 7A-7C.

Figure 7A:
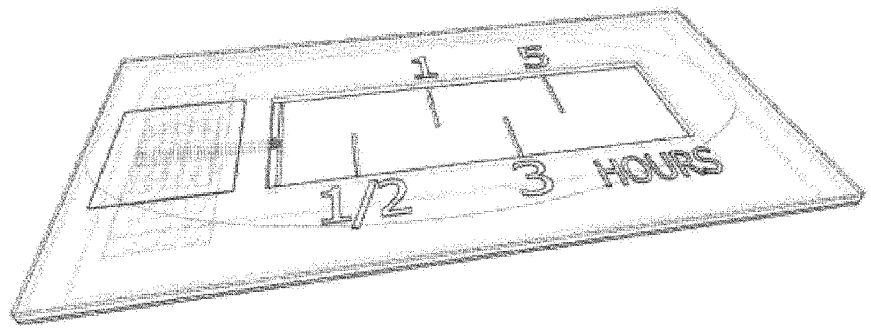
FIGS. 7A-7C are diagrams showing a process in which a spread material is diffused and displayed through the time-temperature indicating module 100 shown in FIG. 1.
Figure 7B:
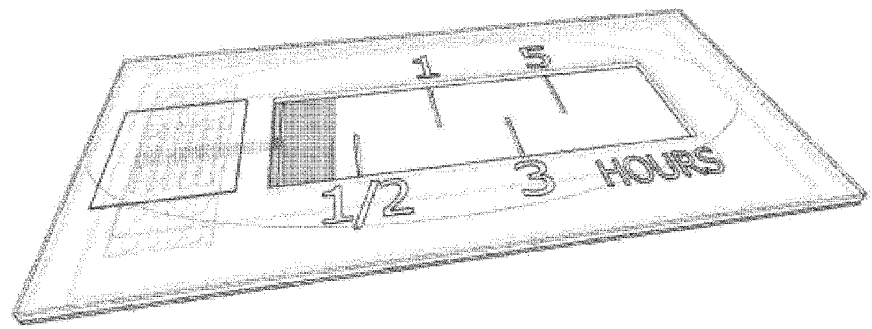
Figure 7C:
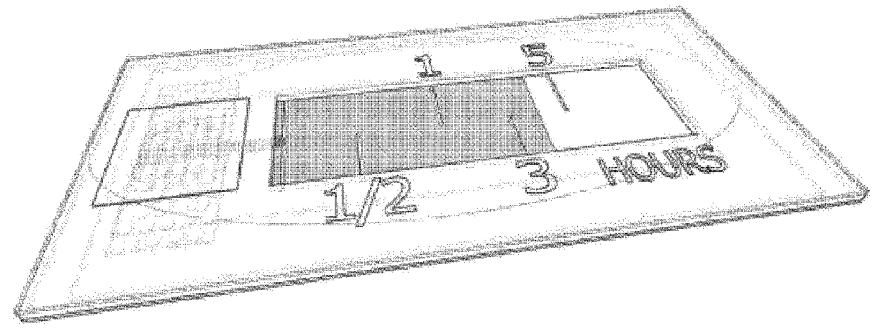

FIGS. 7A-7C is a diagram showing a process in which a spread material is diffused and displayed through the time-temperature indicating module 100 shown in FIG. 1.

FIG. 7A shows a state in which the cracking member 160 is not burst yet. In this state, the spread material is not yet absorbed into the diffusion film 130, and therefore, the diffusion film 130 is not transparent and the color of the color film 140 is not revealed.

FIG. 7B shows that as the cracking member 160 is burst to create a crack, the spread material is introduced toward the diffusion film 130 through the inflow region 111, the diffusion film 130 absorbs the spread material and becomes transparent, and the color of the color film 140 is gradually revealed. The color of the color film 140 means the degree of diffusion of the spread material.

In this case, the spread material continues to diffuse while being absorbed through the diffusion film 130, starting from the diffusion start reference line 122.

In FIG. 7C, as the diffusion film 130 continues to absorb the spread material, the diffusion film 130 becomes transparent, and accordingly, the color of the color film 140 continues to be revealed. In this case, the spread material diffuses through the diffusion film 130 by melting according to an attachment to which the time-temperature indicating module 100 is attached or the ambient temperature. In this case, the degree of diffusion of the spread material can be visually recognized by the user through the time-temperature (for example, 30 min., 60 min., and 120 min.) displayed on the indication window-printed film 110.

The invention claimed is:

1. A time-temperature indicating module comprising:
   an indication window-printed film having an upper surface on which an indication window for enabling a degree of diffusion of a spread material to be visually recognized to an outside is printed and one side region provided with an inflow region for inflow of the spread material;
   a diffusion guide line printed on a lower side of the indication window-printed film for enabling a degree of diffusion of the spread material introduced through the inflow region to be indicated, and having an embossed surface;
   a diffusion film provided on the lower side of the indication window-printed film and configured to absorb and diffuse the spread material introduced through the inflow region;
   a color film provided to have a specific color on a lower side of the diffusion film, and configured, as the diffusion film becomes transparent when the spread material is diffused through the diffusion film, to enable the specific color to be visually recognized to the outside through the indication window-printed film;
   a lower leakage-preventing film provided on a lower side of the color film and configured to prevent the spread material introduced through the inflow region from leaking to the outside;
   a cracking member provided on an upper side of the indication window-printed film and configured to temporarily cover the inflow region, to be cracked by external force and to allow the spread material to be introduced through the inflow region; and
   an upper leakage-preventing film laminated along an upper surface edge of the indication window-printed film and filled with the spread material and configured to prevent the spread material from leaking to the outside.

2. The time-temperature indicating module of claim 1, wherein one or more incision lines are formed in the inflow region, and the spread material is introduced through the one or more incision lines.

3. The time-temperature indicating module of claim 2, wherein when the cracking member is cracked by external force, the spread material is introduced through the one or more incision lines.

4. The time-temperature indicating module of claim 1, wherein the diffusion guide line comprises:
  a diffusion start line formed to have a larger area than the inflow region and having an embossed surface;
  a diffusion start reference line formed to have a specific length in a longitudinal direction of the indication window-printed film, starting from the diffusion start line, and serving as a diffusion start reference point of the spread material diffusing through the diffusion film; and
  one or more diffusion lines for displaying the degree of diffusion of the spread material diffusing along the diffusion film, and
  wherein a space for introducing the spread material is secured between the diffusion guide line and the diffusion film by the embossing.

5. The time-temperature indicating module of claim 4, wherein the diffusion start reference line is formed to protrude from a lower surface of the indication window-printed film, and
  wherein the spread material introduced through the inflow region starts to diffuse by the diffusion film, escapes through a gap formed between the diffusion film and the diffusion start reference line, and gradually expands in diffusion in the longitudinal direction of the diffusion film.

6. The time-temperature indicating module of claim 4, wherein the indication window-printed film is formed with a display window of a transparent region for enabling the diffusion start reference line and the one or more diffusion lines to be visually recognized to the outside, and
  wherein as the spread material is diffused, the one or more diffusion lines are sequentially visible through the display window and displayed to the outside.

7. The time-temperature indicating module of claim 1, wherein each of the upper leakage prevention film and the indication window-printed film is made of at least one of a polyethylene terephthalate (PET) material, a polypropylene (PP) material, a polyethylene (PE) material, or a nylon (NY) material that are heat-fusible to each other.

8. The time-temperature indicating module of claim 1, wherein the diffusion film is a micro-porous film.

9. The time-temperature indicating module of claim 1, wherein the spread material is fatty acid ester.

* * * * *